July 21, 1970  P. W. MARTIN  3,521,144
VOLTAGE MULTIPLIER HAVING METALLIC FOIL CAPACITORS
Filed Sept. 16, 1966  7 Sheets-Sheet 1

PHILIP W. MARTIN
INVENTOR.
WHANN & McMANIGAL
Attorneys for Applicant
BY

July 21, 1970 P. W. MARTIN 3,521,144
VOLTAGE MULTIPLIER HAVING METALLIC FOIL CAPACITORS
Filed Sept. 16, 1966 7 Sheets-Sheet 2

PHILIP W. MARTIN
INVENTOR.
WHANN & McMANIGAL
Attorneys for Applicant
BY

July 21, 1970  P. W. MARTIN  3,521,144
VOLTAGE MULTIPLIER HAVING METALLIC FOIL CAPACITORS
Filed Sept. 16, 1966  7 Sheets-Sheet 3
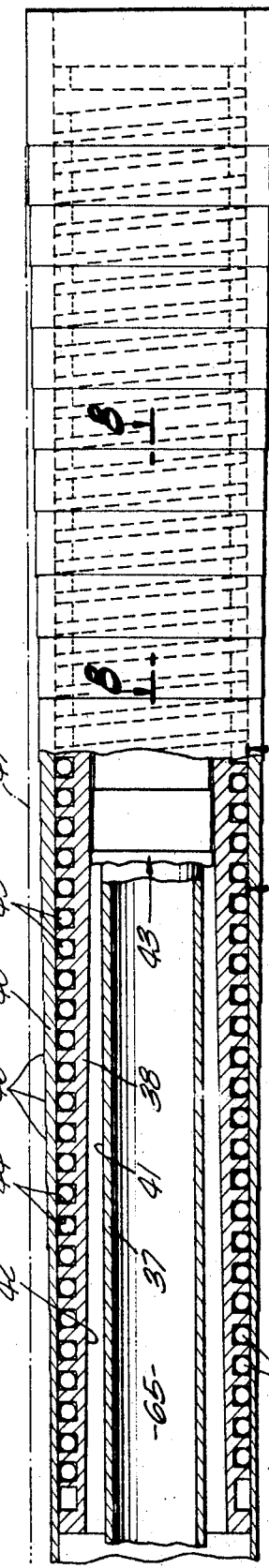
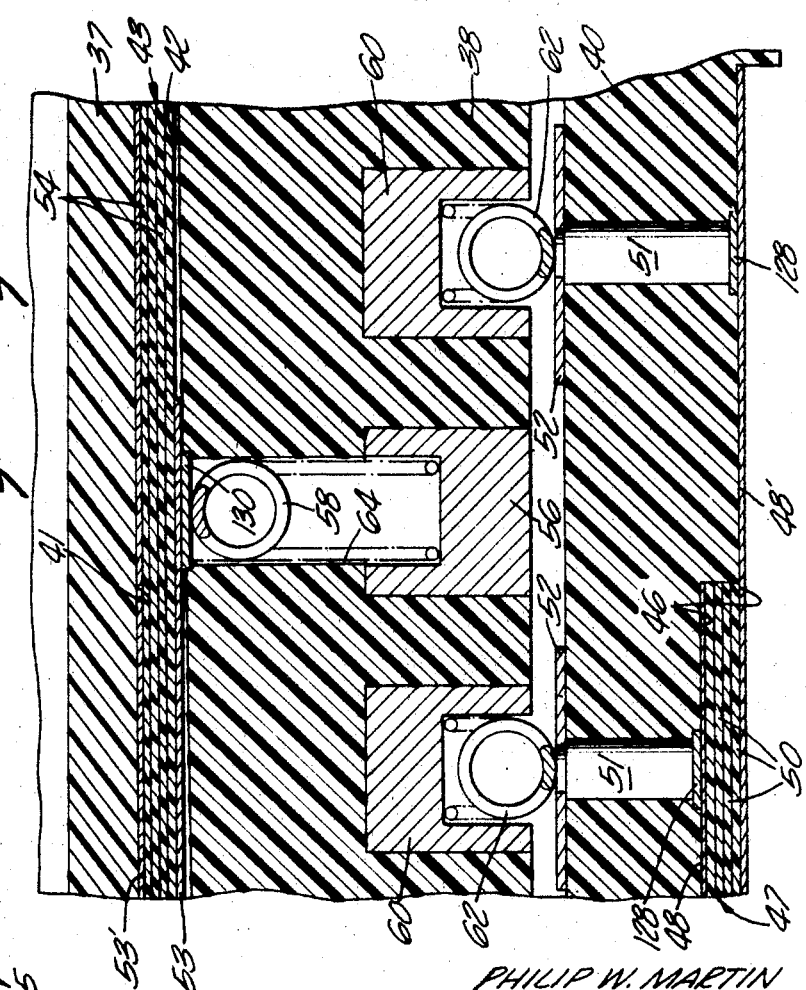
PHILIP W. MARTIN
INVENTOR.
WHANN & McMANIGAL
Attorneys for Applicant
BY July 21, 1970  P. W. MARTIN  3,521,144
VOLTAGE MULTIPLIER HAVING METALLIC FOIL CAPACITORS
Filed Sept. 16, 1966  7 Sheets-Sheet 4
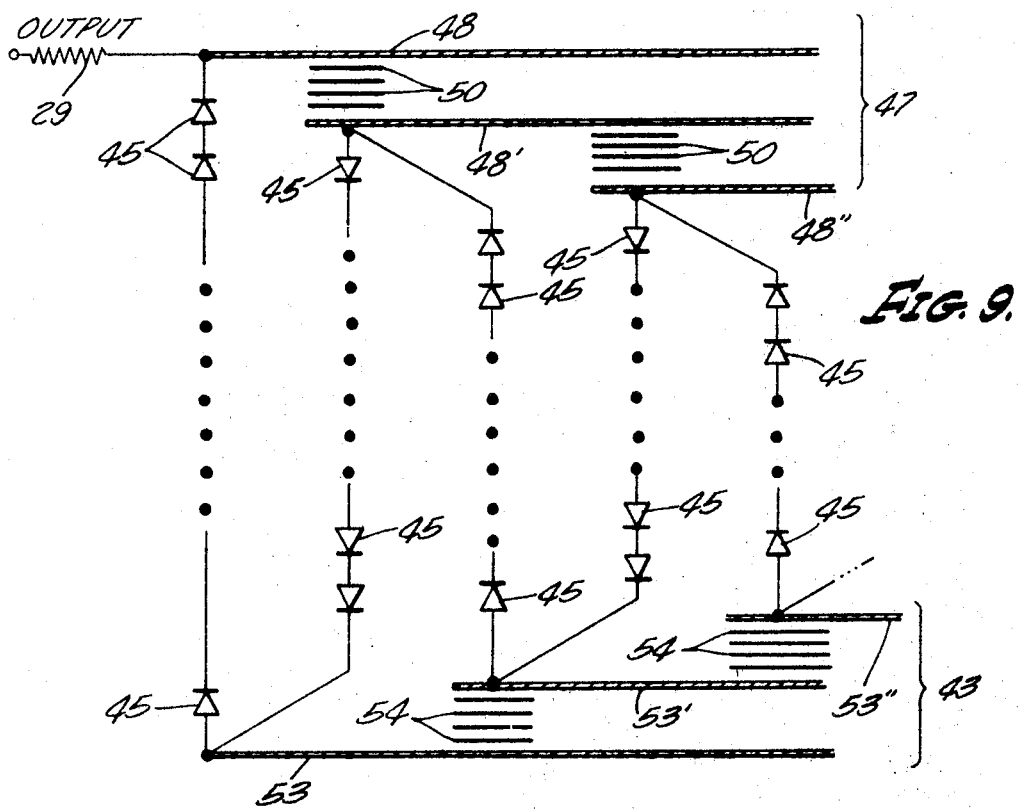
FIG. 9.
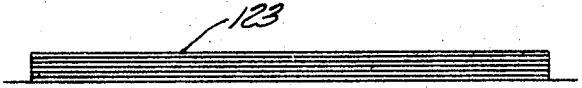
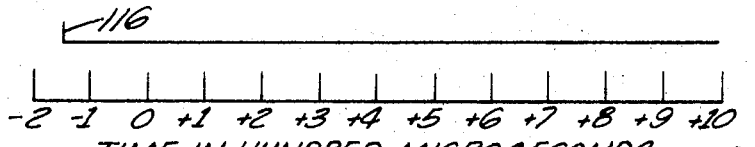
FIG. 11.
PHILIP W. MARTIN
INVENTOR.
WHANN & McMANIGAL
Attorneys for Applicant
BY July 21, 1970 P. W. MARTIN 3,521,144
VOLTAGE MULTIPLIER HAVING METALLIC FOIL CAPACITORS
Filed Sept. 16, 1966 7 Sheets-Sheet 5

PHILIP W. MARTIN
INVENTOR.
WHANN & McMANIGAL
Attorneys for Applicant
BY

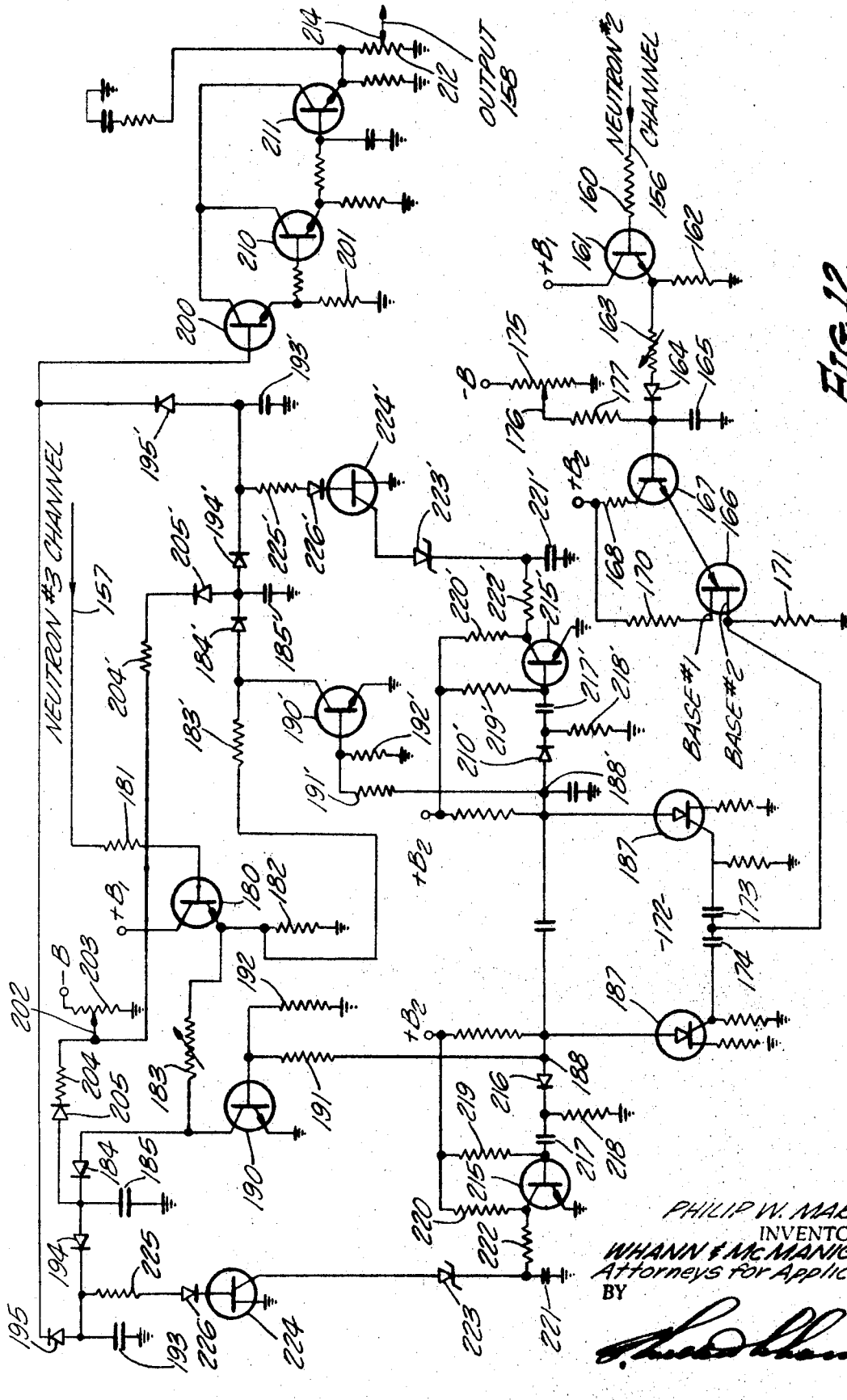

United States Patent Office 3,521,144
Patented July 21, 1970

3,521,144
VOLTAGE MULTIPLIER HAVING METALLIC FOIL CAPACITORS
Philip Martin, 1345 West Road,
Whittier, Calif. 90603
Filed Sept. 16, 1966, Ser. No. 579,954
Int. Cl. H02m 7/00
U.S. Cl. 321—15                                18 Claims

ABSTRACT OF THE DISCLOSURE

A high-voltage multiplier of the Cockroft-Walton type for operation in a space having relatively small diameter, such as an oil well, in which a string of serially connected diodes is disposed in the groove of an outer thread formed on a middle tube support, one set of capacitors being disposed on an inner tube, these capacitors comprising a sheet of dielectric material and foils of metal of graduated sizes interposed between successive windings of the sheet of insulating material, a similar set of capacitors being provided on an outer tube, the tubes being in concentric relation, and the capacitors of the inner and outer tubes being connected by spring contacts to junction points between predetermined ones of the diodes.

---

This invention relates generally to the exploration and analysis of unknown substances by means of high-energy neutrons, and particularly relates to a nuclear system for analyzing and investigating unknown substances such as geological formations on the ground and under ground by high-energy neutrons generated by means of a linear accelerator.

The nuclear logging system of the present invention utilizes a linear accelerator of the type disclosed and claimed in the Martin and Stroud Pat. No. 3,020,408, issued on Feb. 6, 1962. Such a linear accelerator may be turned on and off at will and, hence, permits to irradiate an unknown substance such as a geological formation or the material about a well bore intermittently with neutrons. This permits the analysis of secondary radiation caused by the primary neutron irradiation. For example, it is feasible to detect and analyze both secondary neutrons and secondary gamma rays generated by the primary high-energy radiation, that is, the primary neutrons. By measuring either the neutrons or the gamma rays a predetermined time after the primary radiation ceases, infomation may be obtained about the half-life of the unstable isotopes created by the primary radiation, or about the neutron capture, or scattering cross-section of the formation. The neutron cross-section of a substance is usually expressed in barns, 1 barn being $10^{-24}$ cm.$^2$.

To this end it is necessary to pulse the linear accelerator in order to turn it on and off. he accelerator operates by ionizing deuterium gas and accelerating the deuterium ions toward a target impregnated with tritium. The resulting deuterium-tritium reaction yields helium and neutrons having an energy of 14 mev. (million electron volts). Such a linear accelerator must be operated with a voltage of the order of a 100 kv. (kilovolts).

Accordingly, the problem arises how to generate the relatively high voltage of the order of a 100 kv. within the narrow diameter required by the exploration unit used for exploring oil wells. Such a well exploration unit may have an outer diameter of 3½" so that considerably less than 3" is available for the high-voltage generator.

Because of the lack of a high-voltage generator which could supply an accelerator tube of the type discused herein within the narrow confines of an exploration unit for an oil well, such controllable neutron sources have not been used to any extent in the past. Most high-voltage supplies take up a considerable space. Among other proposals it has been suggested to utilize a Van de Graaff electrostatic generator. This generator requires a fast-moving, endless belt for carrying an electric charge into a suitable structure such as the interior of a sphere. The mechanical problems inherent in moving an endless belt at a high speed within a well exploring unit are rather formidable.

Further, in order to be able to move the well exploration unit at the usual speed to log a deep well within a reasonable time, it is necessary that the tube generate a copious supply of high energy neutrons. The literature indicates that other accelerators which are intended for operation in a well, have a neutron supply of the order of $10^8$ neutrons per second or $10^5$ neutrons per pulse. A neutron supply of at least an order of magnitude larger would be desirable such as $10^9$ neutrons per second. This would make it possible to move the exploration unit at a reasonable speed and still have enough neutrons available to permit the analysis of secondary radiation within the time available.

It is accordingly an object of the present invention to provide an electronic voltage multiplier capable of yielding an output voltage of the order of a 100 kv. and of such size that it may be disposed in the rather restricted space of a well exploration unit, that is, which has an outer diameter considerably less than 2 or 3 inches.

Another object of the present invention is to provide a novel nuclear system particularly adapted for exploring oil wells, or for analyzing unknown substances on the surface or below by means of secondary radiation created by the primary irradiation by fast neutrons which can be turned on and off at will.

A further object of the present invention is to provide a high voltage for supplying a linear accelerator suitable for operation within an oil well which may be turned on and off at will to permit detecting and analyzing secondary radiations such as neutrons or gamma rays in accordance with their energies and at predetermined times after the primary irradiation has ceased.

Still another object of the present invention is to provide a high-voltage supply of the type referred to which is electrically equivalent to a Cockroft-Walton circuit and which has enough stages to multiply the input voltage on the order of 10 or 40 times.

Still a further object of the present invention is to provide a structure capable of insulating on the order of 100 kv. within the narrow diameter of a tool capable of exploring an oil well or the like.

The voltage multiplier of the present invention consists of a serially connected string of diodes disposed about a middle tube. There are further provided two sets of capacitors. One of the sets of capacitors may, for example, be disposed on an inner tube and consists of a sheet of insulating or dielectric material which may advantageously be a sheet of fluorocarbon resin, generally known by the trademark "Teflon," and foils of metal of graduated size interposed between successive windings of the sheet of insulating material. Alternatively, a fluorocarbon resin known by the trademark "Kapton" may be used. A similar set of capacitors may be provided, for example, in the same manner on an outer tube, the tubes being disposed concentric to each other. The capacitors are connected to the junction point between predetermined ones of the diodes, thereby to form a Cockroft-Walton circuit.

It will be realized that due to the graduated sizes of metallic foils, the capacitors also have varying capacitance. This, however, is of advantage because it makes it possible to have a large capacitance at the input and smaller capacitances at the output of the circuit which is highly desirable. If sufficient stages are provided, such for example, as about 40, the input voltage can be multiplied in the order of 20 times. Actually, the theoretical voltage multiplication is higher, but is reduced by the effects of distributed capacitance of the diodes and the respective tubes on which the metallic foils forming the capacitors are wound.

The present invention also includes a nuclear system for analyzing, measuring and indicating the energies and the average number of secondary neutrons and gamma rays which occur during irradiation or a predetermined time after the cessation of the irradiation by the primary neutrons which may have an energy of 14 mev.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 4 is an elevational view, parts being broken away, showing the inner tube, middle tube and outer tube used for providing a voltage multiplier structure in accordance with the present invention;

FIG. 8 is a sectional view taken substantially on line 8—8 of FIG. 4 and illustrating particularly the inner and outer spring contacts together with the set of inner and outer capacitors;

FIG. 9 is a schematic representation in the nature of an equivalent circuit diagram showing the interconnections of the continuous string of diodes with the inner and outer sets of metallic foils forming respective electrodes of the inner and outer sets of capacitors of the voltage multiplier;

Figure 10A:
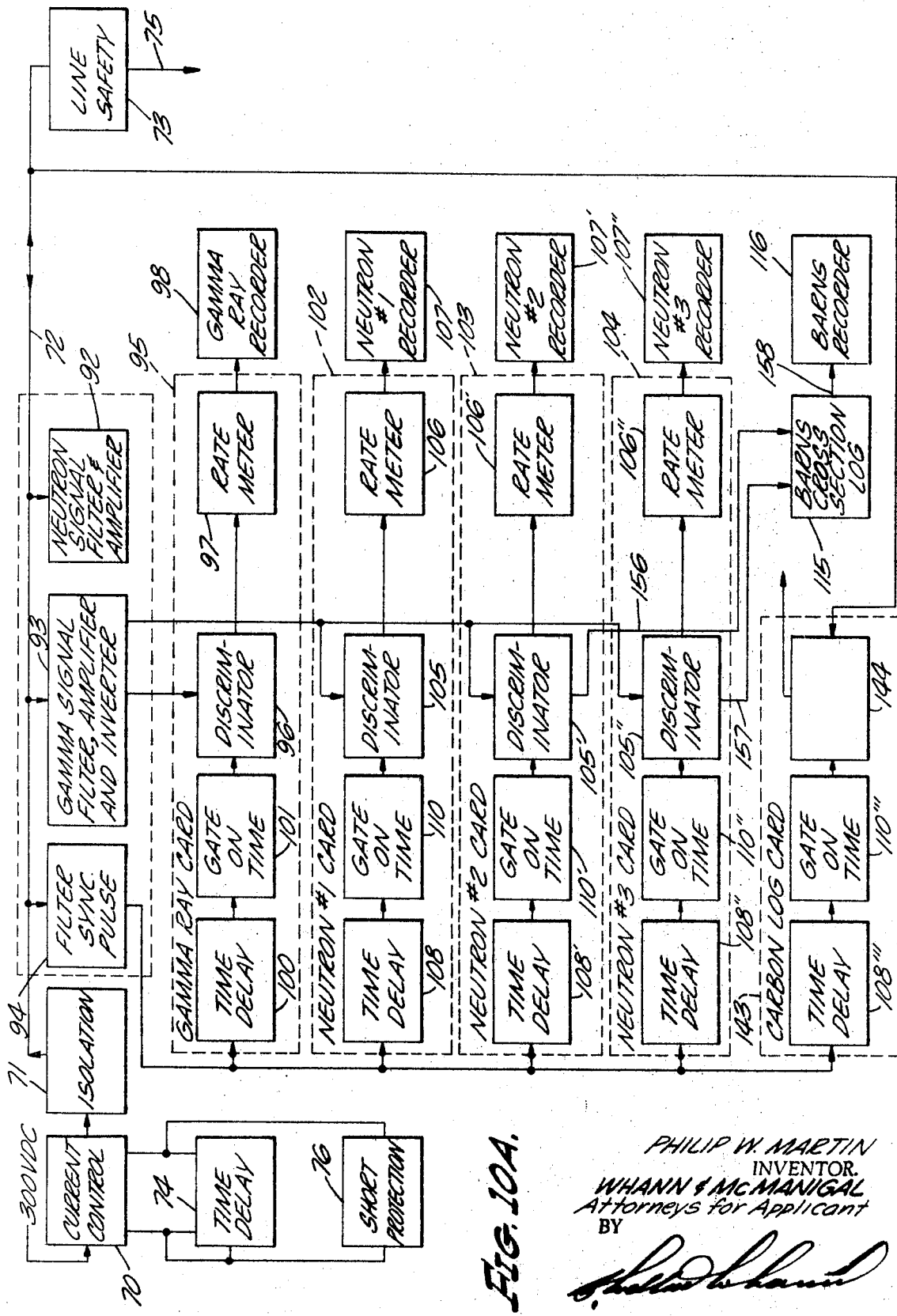
FIGS. 10A and 10B are block diagrams of the nuclear system of the present invention and illustrating the surface equipment as well as the downhole instrumentation for detecting, measuring and indicating the average numbers of secondary neutrons and gamma rays caused as a result of a primary neutron irradiation.

FIG. 11 is a time chart illustrating as a function of time a gamma ray log and various sets of neutron logs taken at particular times in accordance with the present invention after the accelerator has been turned off, thereby to terminate the fast neutron irradiation; and FIG. 12 is a circuit diagram of a circuit for dividing two different trains of pulses to obtain an output signal representative of the one pulse train divided by the other, and which forms part of the block diagram of FIG. 10A and particularly of the neutron cross-section log.

Figure 1:
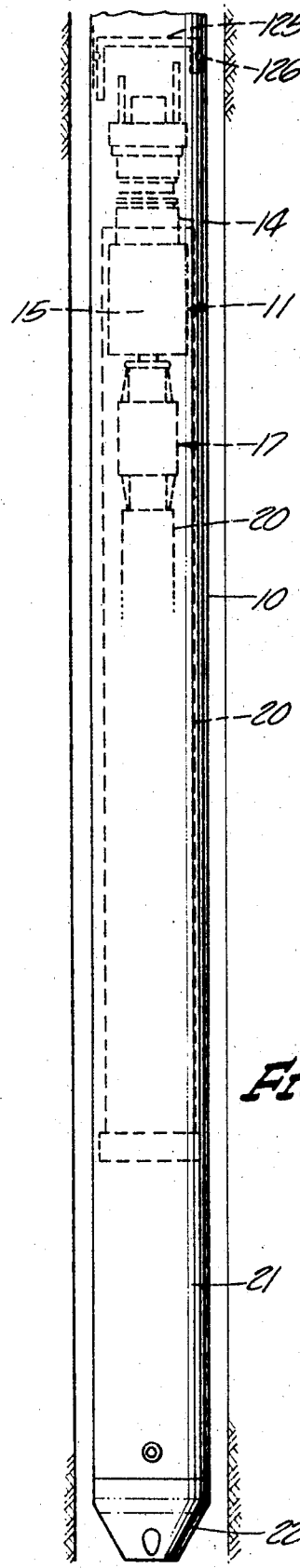
FIG. 1 is a sectional view on greatly reduced scale of an exploration unit suitable for exploring a well bore and including the voltage multiplier of the invention.
Figure 2:
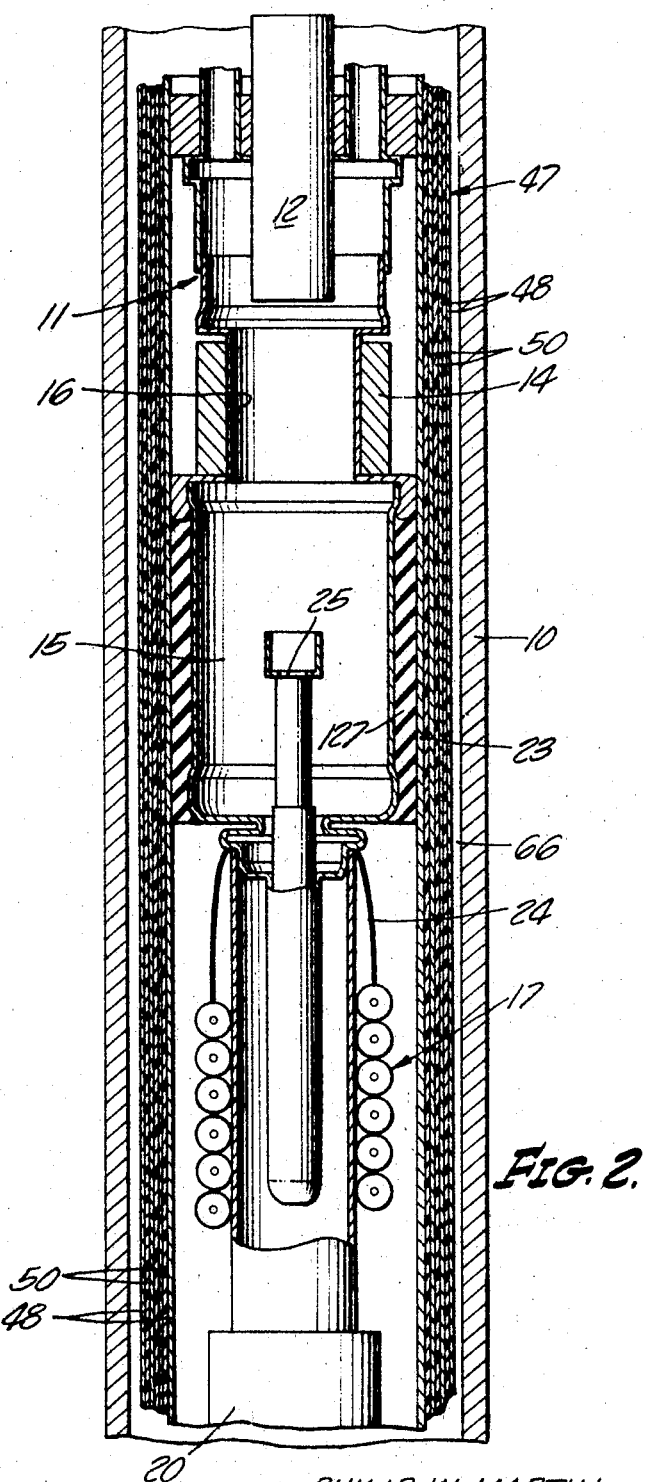
FIG. 2 is a sectional view on somewhat enlarged scale of a portion of the exploration unit of FIG. 1 showing particularly a cross-section of the linear accelerator of the type disclosed and claimed in the Martin and Stroud patent above referred to and current limiting resistors for supplying the high voltage to the accelerator.

Referring now to the drawings, and particularly to FIGS. 1 and 2, there is illustrated, by way of example, a well exploration unit carrying a linear accelerator, its high voltage supply and the electronics for operating the accelerator. The outer pressure housing 10 is conventionally made of steel to withstand the pressure in an oil well and may have an outer diameter of 3.5" and an inner diameter of 2.9". This leaves approximately 2.5" as the outer diameter for the linear accelerator, the electronics and the voltage multiplier.

The linear accelerator is generally indicated at 11 and may, for example, include a rod magnet 12 connecting one electrode of the accelerator, a ring magnet 14 within which is disposed the ionization source while the target 25 is arranged within the chamber 15. Since the construction and operation of this accelerator are disclosed in the previously referred to Martin and Stroud patent, no further explanation is necessary here. It should be noted, however, that the accelerator requires a high-voltage supply on the order of a 100 kv. for the target 25 within the chamber 15, a high-voltage pulsed supply on the order of 1 kv. which may be applied to the electrode 16 on the ring magnet 14 and a filament voltage on the order of 1.5 volts for heating a filament or coil to give off or absorb deuterium or tritium gas from the tube upon being heated or cooled.

A set of current limiting resistor 17 which may, for example, amount to a total of about 150 resistors, each having 750 ohms resistance and being capable of carrying ¼ watt power is connected to the voltage multiplier generally indicated at 20. The current limiting resistors 17 are preferably connected in series in the form of a spiral and are disposed as shown about the entrance stem of the accelerator tube. The resistors 17 may be disposed inside a "Teflon" tube which is a fluorocarbon resin, which in turn is spirally wrapped about the entrance stem of the tube of the accelerator. The space shown at 21 in the housing 10 may house various electronic equipment such as voltage supplies and the like. The bottom of the exploration unit may be provided with a bull nose 22 as is conventional.

The accelerator may be disposed in a suitable tube 23 of insulating material which may, for example, consist of glass fibers impregnated with resin. It should be noted that the resistors 17 are electrically connected in series by leads 24 to the target 25 which may contain or may be impregnated with tritium.

The chamber 15 is surrounded with a cylinder of insulating material indicated at 127 which, in turn, is disposed within the insulating tube 23. Preferably, this insulating cylinder 127 consists of a silicone resin which is bonded to the chamber 15 of the accelerator tube. This silicone resin cylinder 127 has the purpose to prevent the flow of silicone oil longitudinally along the tube.

As pointed out before there may be some ionization of the oil due to the high voltage gradient. Hence, under the influence of the high electric field within the neighborhood of the accelerator tube the ionized oil has a tendency to flow which tends to build up destructive voltage charges at undesired points along the envelope of the accelerator. Such concentrated and undesirable voltage charges may actually puncture the envelope of the accelerator by creating sparks or point discharges. This motion of the silicone oil may be caused by ionization of the oil or else by impurities in the oil which may become electrically charged.

It will be apparent that movement of the ionized silicone oil may generate a voltage in a manner similar to that of a Van de Graaff generator. Accordingly it will be appreciated that movement of the ionized oil not only may cause the envelope of the tube to be punctured by electric discharge but obviously will cause a considerable loss of power. Therefore, by providing a solid silicone resin cylinder 127 this is effectively avoided.

Figure 3:
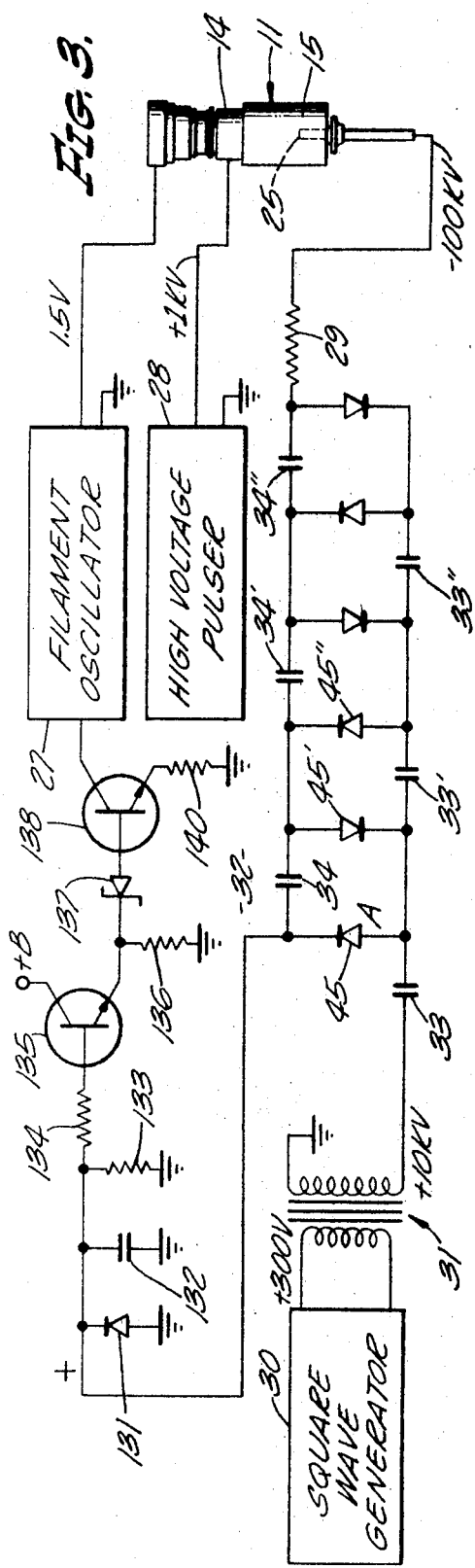
FIG. 3 is a circuit diagram, partly in block form, illustrating the various voltages supplied to the accelerator shown in FIG. 2 and including a conventional Cockroft-Walton voltage multiplier circuit.

Referring now to FIG. 3 there is shown a block diagram of the various voltage supplies for the accelerator 11 including the Cockroft-Walton voltage multiplier circuit 32. Thus there is a source 27 which may be an oscillator for supplying a filament voltage of the order of 1.5 volts as indicated to the accelerator. This filament voltage permits to heat a heater coil constructed of a metal which will take up deuterium or tritium gas or give it off to control the gas pressure in the tube. The gas pressure control may be effected automatically as will be subsequently explained.

There is also provided a high-voltage pulser 28 which supplies a voltage of the order of +1kv. to the electrode 14 of the ionization source. In the absence of the high voltage supplied by the pulser 28, the accelerator is inoperative. After the high voltage has been supplied to the electrode 14 of the ionization chamber, the accelerator will develop high-energy neutrons after a certain time delay as will be more fully explained hereinafter. Thus, the high-voltage pulser 28 permit turning the accelerator on and off at will.

The high voltage required for the target is supplied by a square wave generator 30, a transformer 31, a Cockroft-Walton circuit or voltage multiplier 32 and through resistor 29 to the target 25 of the accelerator. This voltage is conveniently a negative voltage and may be of the order of a 100 kv. I have found it more convenient to provide a square wave generator for driving voltage multiplier circuit 32. One of the reasons is that I prefer to use transistors which are more efficiently operated to produce square waves. In any case, the square wave generator 30 develops an output voltage on the order of 300 volts peak-to-peak to the primary of transformer 31. The secondary of the transformer may develop an output voltage of the order of 10 kv. peak-to-peak, having a generally sine-wave shape. I have found that best results are obtained when the primary winding of transformer 31 is bi-filar wound, while the secondary winding is pi-wound.

This voltage is then multiplied by the voltage multiplier, say 10 or 20 times, and the output voltage is fed through the resistor 29 to the target of the accelerator. The voltage multiplier consists of two banks of capacitors 33, 33', 33", and 34, 34' and 34". These capacitors are alternately connected by electronic switches such as diodes 45, 45', 45", etc. It will be noted that there are as many diodes or sets of diodes as there are capacitors. Also the diodes are all connected in series. Theoretically the output voltage of such a voltage multiplier is approximately equal to the number of capacitors times the peak transformer voltage. However, in practise, the ultimate output voltage obtainable is much lower than that. As explained before, this may be due to the distributed capacitance of the system and other sources of losses.

Such a voltage multiplier operates in a conventional manner. For example, during the first half cycle of the alternating voltage or square wave driving the transformer 31, capacitor 33 charges to the transformer voltage. At the same time, the diode 34 charges capacitor 34. During the next half cycle the diode 45 is nonconducting. However, the combined voltage of the transformer which has discharged capacitor 33 and the voltage previously put on capacitor 34, charges capacitor 33' through diode 45'.

This procedure is then repeated during following half cycles until eventually the last capacitor 34" is charged up to the required negative voltage. It should be noted that all diodes 45, 45', 45" etc. are connected to each other and in series.

It should be noted that the resistor 29 shown in FIG. 3 corresponds to the various resistors 17 of FIG. 2. As pointed out before, there may be 150 of these resistors connected in series to protect the accelerator and to carry the high voltage. The combined resistance of these resistors may be of the order of 10 to 100K ohms (kiloohms).

In accordance with the present invention there is provided a voltage multiplier structure corresponding to the circuit illustrated at 32 in FIG. 3 which can be accommodated in the limited space available in a well exploration unit. In other words, the entire voltage multiplier structure has been built to fit a space having an outer diameter which is no more than 2.5". It can even be accommodated within an outer diameter of less than 1¾". Hence, the entire voltage multiplier and accelerator has been accommodated in an exploration unit having an outer diameter of 3.5" and can be scaled down even more to have a much smaller outer diameter. This voltage multiplier apparatus is shown particularly in FIGS. 4 through 8 to which reference is now made.

As shown particularly in FIG. 4, the voltage multiplier support structure includes an inner tube 37, a middle tube 38 and an outer tube 40 in nested or concentric relationship. The inner tube 37 has a straight, continuous outer diameter 41 as shown. The middle tube 38 has a tapered inner diameter 42 which is smaller on the right-hand side and larger on the left-hand side (as viewed in FIG. 4) to accommodate the inner set of capacitors wound on the inner tube 37 generally indicated at 43.

The middle tube 38 is provided with a square, outer thread 44 extending substantially over the entire length of the tube. Disposed within the threads 44 is a continuous chain of interconnected diodes 45 which are arranged in series.

The outer tube 40 is disposed adjacent the screw threads 44 of the middle tube 38. The outer surface 46 has stepped diameters as shown on an exaggerated scale in FIG. 4. Thus, the diameters of the outer surface 46 of the outer tube 40 increase from left to the right to accommodate an outer wrap 47 forming the outer capacitors of the multiplier structure.

The continuous chain of diodes 45 is connected at predetermined junction points to the set of inner capacitors 43 and the set of outer capacitors 47 in a manner presently to be described.

The outer capacitor 47 consists of alternate layers of metallic foil 48, 48' and layers of insulation 50, as clearly shown in FIG. 8. Both the metallic foils 48, 48' and the layers of insulation 50 are spirally wrapped on the outer stepped surface 46 of the outer tube 40. The inner tube 37, the outer tube 40 and the middle tube 38 should consist of an insulating material such, for example, as glass fibers impregnated with an epoxy resin. Such a material will withstand relatively high temperatures and has good insulating qualities.

The metallic foil 48 may, for example, consist of aluminum foil, while the layers of insulation 50 may consist of a fluorocarbon resin known generally by the trademark "Teflon." This material has been selected because it has good insulating qualities, and will withstand fairly high temperatures as well as high voltages. Thus, it has been found that fluorocarbon resins have better dielectric strength at temperatures above 350° F. than other flexible insulating materials. Furthermore, it has been found that Teflon having a thickness of the order of 2 mils will withstand 4000 volts per mil. It will withstand a lower voltage at greater thicknesses. Thus, a layer of a thickness of 8 mils will withstand on the order of 2500 volts per mil.

It has been found that all solid insulators including fluorocarbon resins will not insulate beyond a certain maximum voltage stress. This is true regardless of the thickness of the layer of insulation. For example, it has been found that a fluorocarbon resin will not insulate beyond a voltage gradient of 50 kv. regardless of the thickness of the layer of insulation. On the other hand, there is an optimum thickness of the insulation which may be of the order of a few mils, such as 4 mils. It should be noted that if the maximum voltage, or a higher than maximum voltage is applied to a sheet of insulation, ionization of the material takes place. Accordingly, the material becomes conductive and breaks down.

The maximum applicable voltage, of course, decreases in the presence of sharp edges and the like, as is well known. The structure of the present invention does not have any sharp edges, but is smooth and round, thus, providing better insulation with a thinner layer. It should be noted that by use of the diodes 45 which are preferably avalanche or Zener diodes, the voltage per layer can be held in the order of 10 kv. Therefore, the voltage gradient across each layer of insulation can be held in safe limits.

Thus, the set of outer capacitors 47 may, for example, be made by utilizing a stepped trapezoidal sheet of Teflon, having a thickness of 2 mils. This sheet is narrower at one end than at the other. Thus, the narrow end of the insulating sheet may be wrapped about the left-hand end of the outer tube 40 as viewed in FIG. 4. After a turn or so of the insulating material, a metallic insulating material of rectangular outline is put over the sheet in such a manner that one end of the foil extends beyond the insulating sheet so that it directly contacts the outer surface 46 of the outer tube 40. This is clearly shown in FIG. 8 where two different metallic foils 48 and 48′ are shown. The metallic foils 48, 48′ may consist, for example, of aluminum foil.

I have found it convenient to wrap four layers of insulation between every two adjacent sheets of metallic foil. Thus, there will be a thickness of 8 mils between every two sheets of foil. However, there may be an optimum thickness of insulation which is less than 8 mils, say around 4 mils. Each of the metallic foils, such as 48 or 48′, forms one electrode of a capacitor. By way of example there may be 22 such capacitors requiring 23 sheets of foil.

It should be noted that the metallic foils, such as 48 and 48′, are of graduated size arranged in such a way that the smallest foils are at the left end, as shown in FIG. 4, that is, adjacent the accelerator, while the largest pieces of foil are on the right-hand end, that is, at the input side of the voltage multiplier. Such an arrangement is very desirable because the voltage multiplied operates more efficiently if the input capacitors have a larger capacitance than the output capacitors.

It should be noted that the metallic foils, such as 48 and 48′, are arranged in such a way that they can be contacted by metallic rings or cylinders 128 which, in turn contact pins 51 extending through suitable apertures in the outer tube 40 and secured therein by a rivet-like head 52.

These metallic rings 128 preferably consist of copper for better electric conductivity and are rings or cylinders disposed about the outer tube 40. How the contact pins 51 with their rivet heads 52 are connected to the diodes will be subsequently explained.

It should be noted that since the narrowest strip of the insulating sheet 50 is wound on the left-hand end of the outer tube 40, the thickest layer will be on the left hand end and the thinnest layer on the right-hand end of the tube. Accordingly, the outer diameter of the outer wrapping, such as shown at 47, will be substantially uniform as indicated in the drawings due to the stepped diameters 46 of the outer tube 40.

It will now be explained how the inner set of capacitors 43 is arranged on the outer surface 41 of the inner tube 37. As noted before, the outer surface 41 is smooth and uniform in diameter. Again the set of inner capacitors 43 is made up of a sheet of insulating material such as Teflon which again has a trapezoidal shape, and a set of metallic foils of graduated sizes. While the outer set of capacitors 47 is wound beginning with the narrow end of the Teflon sheet, the inner set of capacitors 43 is wound beginning with the wide end of the Teflon sheet. This is wound over the entire length of the inner tube 37. In this case again the metallic foils such as 53 and 53′ as shown in FIG. 8 are arranged in such a way that they can be contacted by a metallic ring or cylinder 130 which, in turn is contacted by suitable spring contacts at the outer surface of the inner set of capacitors. The insulating sheet 54 is conveniently again arranged with 4 layers separating each two layers of metallic foil, such as 53 and 53′. Thus, the wide end of the insulating sheet 54 is first wrapped around the entire length of the inner tube 37. As the insulating sheet 54 becomes narrower, it will no longer be able to reach the right-hand end of the inner tube 37, thus, leaving free some outer surface.

Between these successive layers or folds are now put the graduated sheets of metallic foil beginning with the largest foil. Hence, again the resulting capacitors have a larger capacitance at the input side than at the output side. Again, the metallic foils are of rectangular size and are put across the insulating sheet as it is continued to be wrapped around the outer tube.

As a result the wrapping of the inner tube 37 is tapered with the thicker end at the left-hand side as viewed in FIG. 4 and for that reason the inner surface 42 of the middle tube 38 is accordingly tapered to accommodate the inner set 43 of capicitors.

It should also be noted that I have found it more convenient and more practical to arrange the foils of such size that they overlap each other. In other words, each of the foils extends about its respective inner tube 37 or outer tube 40 through more than a full revolution. The reason for this overlap of the metallic foils is to make sure that each layer of insulation sees no more than one metallic foil having a higher potential. This, of course, means that there is no danger of breakdown, arcs, or discharges between the layers of insulation.

Each foil is separated from the next foil by four layers of insulation. Since there are 22 outer capacitors and 22 inner capacitors, they each require a set of 23 metallic foils.

The manner in which the sets of inner and outer capacitors are interconnected with the continuous set of serially connected diodes will now be described.

Figure 7:
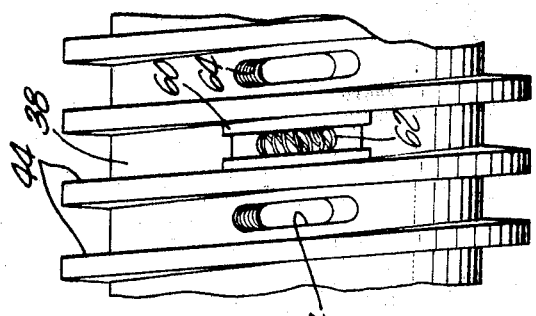
FIG. 7 is an elevational view taken substantially on line 7—7 of FIG. 4 and illustrating the middle tube of the voltage multiplier having a square screw thread with apertures for the spring contacts for contacting one of the metallic foils forming an electrode of the inner set of capacitors.
Figure 6:
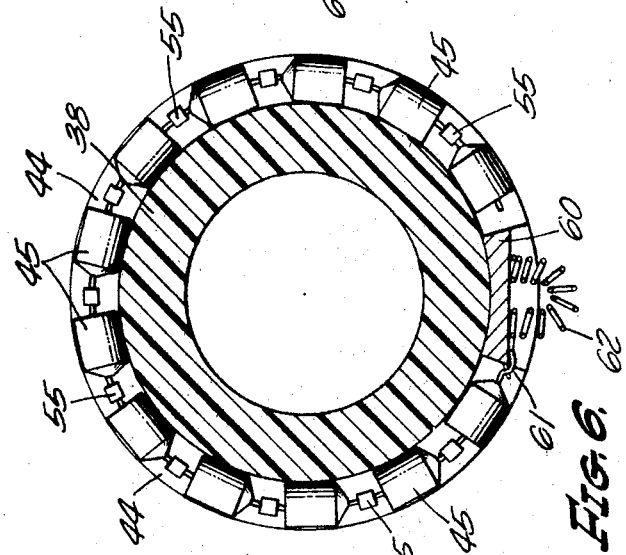
FIG. 6 is a cross-sectional view similar to that of FIG. 5 and also illustrating a string of diodes extending substantially through a full circle with a spring contact for contacting a metallic foil forming one of the electrodes of the outer set of capacitors.
Figure 5:
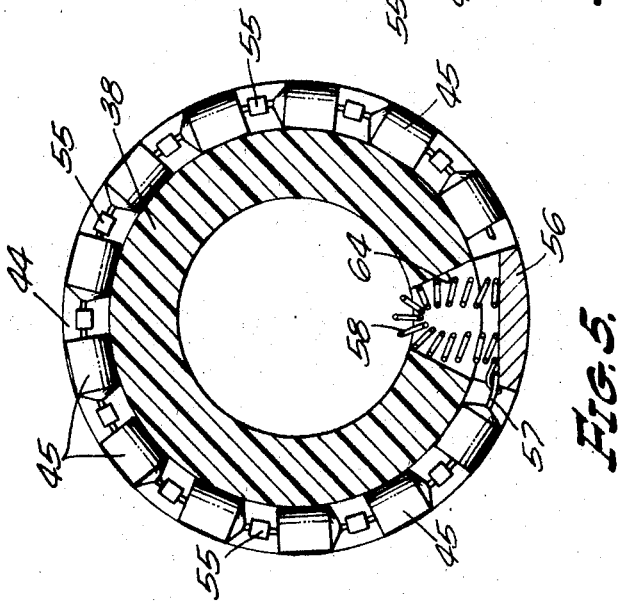
FIG. 5 is a cross-sectional view of the structure of FIG. 4 and illustrating one string of diodes arranged substantially in a circle with a spring contact for contacting a metallic foil constituting one of the electrodes of the inner set of capacitors.

As shown particularly in FIGS. 5 through 7, the diodes 45 are arranged in a serially-connected, continuous set. They are interconnected by the connectors 55 which are conventional squeeze connections. The diodes are, of course, disposed in the screw thread 44 of the middle tube 38. Each complete circle of diodes consists of 12, as shown in FIGS. 5 and 6. Each junction between diode number 12 and the subsequent diode is connected to an electrical connector. This consists, as shown in FIG. 5, of an inner spring base 56 which is generally U-shaped as shown in FIG. 8. The diodes are connected to each other by a connector or lead 57 and in turn to an inner spring contact 58 which may consist of a coil spring bent into the general shape of a U, as shown in FIG. 5, both ends of the spring 58 being connected or secured such as by soldering to the inner spring base 56.

Some of the outermost turns of the inner spring 58 make contact with the metallic ring 130 which, in turn, is in contact with one of the metallic foils 53 as shown in FIG. 8. Again the contact ring 130 may consist of copper to provide for better electrical conductivity and extends like a cylinder about its inner tube 37. This provides a connection between one of the electrodes of the set of inner capacitors 43 and the junction between one set of 12 diodes and the succeeding set.

The outer set of capacitors 47 is similarly connected to the diodes. To this end there is again provided an outer spring base 60 (see FIG. 6) which again is of generally U-shape, as shown in FIG. 8. By means of the connector or lead 61 the junction between one set of 12 diodes and the next is connected to each other and to an outer spring contact 62 which again is a coil spring bent into generally U-shape, as shown in FIG. 6. One of the outermost turns of the outer spring contact 62 makes electrical contact with the rivet head 52 and the pin 51, which in turn is connected to one of the outer metallic foils such as 48 or 48'. Hence, again there is made contact between one of the metallic foils such as 48 or 48' forming one electrode of a capacitor and a junction between one set of 12 diodes and the next.

As shown particularly in FIG. 7, the middle tube 38 is provided with tapered apertures 64 through which extend the inner spring contacts 58. Only every alternative groove 44 is provided with such an aperture 64. The outer spring contact 62 projects upwardly into the grooves between each pair of apertures 64.

It should be noted that the hollow space 65 within the inner tube 37 is filled with a suitable insulating liquid. I have found that conventional transformer oil is not suitable for purposes of the present invention. The reason for this is that the transformer oil may become ionized, at least in part, due to the high voltage existing. In view of the electric field the ionized oil tends to move in such a direction as to dissipate the voltage ingredient. However, I have found that silicone oil will provide good insulation without being electrically polarized by the high voltage as is conventional transformer oil and will withstand high temperatures.

It should also be noted that the space 66 outside the outer tube 23 as shown in FIG. 2 may also be filled with a liquid dielectric such, for example, as silicone oil. This will insulate both the voltage multiplier and the accelerator from the outer metallic pressure housing 10 and will also permit to equalize internal pressures, where necessary, in a conventional manner.

In order to equalize the hydraulic pressures, there may be provided a floating seal shown at 15 in FIG. 1. This may be provided with a conventional seal ring 126 of O-shape. This permits the silicone oil to expand or contract in accordance with changes of temperature, and, by movement of the seal 125 to equalize the pressure within that portion of the pressure housing 10 within which the accelerator 11 is located. This will prevent any damage to the accelerator by increased hydraulic pressure, and will prevent the existence of a vacuum about the accelerator which could also destroy the tube.

It will be noted from an inspection of FIG. 2 that the outer set of capacitors 47, that is, the layers of insulation 50 and of metallic foils 48 extend about the accelerator tube 11. In other words, the outside layers of metallic foil 48 are graded in such a manner or have such size that they extend along the length of the accelerator tube. The purpose of this is to distribute the voltage gradient across the voltage multiplier along the length of the tube. This reduces the voltage gradient on the tube as well as the voltage gradient or voltage differential across any particular layer of insulating film 50. It should be emphasized again that any one layer of insulating material such as 50 should see only one layer of metallic foil at a higher potential such as 48. In spite of the use of silicone oil there is still a certain amount of movement of the oil, which may create a voltage higher than the voltage existing at the voltage multiplier output.

In order to visualize better the electrical equivalent of the voltage multiplier structure as depicted in FIGS. 4 through 8, reference is now made to FIG. 9 which shows a simplified or equivalent circuit diagram of the voltage multiplier structure. As shown therein, the resistor 29 connects the voltage multiplier structure to the linear accelerator. The set of outer capacitors 47 is represented by successive metallic foils 48, 48', 48" etc., between which are arranged layers of insulation shown at 50.

Similarly, the set of inner capacitors 43 is represented by metallic foils 53, 53', 53" etc., separated by layers of insulation 54. A set of 12 diodes 45 interconnects metallic foils 48 and 53. The next set of 12 diodes connects metallic foil 53 to 48'. Thereupon, another set of 12 diodes 45 interconnects metallic foils 48' to 53' and so on. FIG. 9 will show the equivalency of this circuit with the voltage multiplier circuit 32 of FIG. 3.

It should be noted that since there are 12 diodes to each set and 44 stages or sets of diodes, the total number of diodes is 528. There is a corresponding number of 44 capacitors, namely, 12 inner and 12 outer capacitors.

The diodes are arranged to be able to withstand nominally 800 volts per diode and actually an even higher voltage. I have found it convenient to utilize avalanche diodes, that is, Zener diodes. The purpose of this is that the chain of diodes will share equally the voltage existing across all diodes.

It should also be noted that each layer of insulation, such as 50 or 54, sees no more than approximately $\frac{1}{20}$ of the total voltage, that is, each layer of Teflon sees no more than about 10 kv. On the other hand, the Teflon will withstand temperatures as high as 200° to 300° C.

The voltage multiplier structure as illustrated particularly in FIGS. 4 through 8 may also be considered as a transmission line. This transmission line, of course, may be tuned and, hence, is equivalent to a parallel resonant circuit. It is well known that a parallel resonant circuit generally has a relatively high Q where Q is the ratio of energy stored to energy dissipated per cycle of the resonant frequency. Accordingly, by having a parallel resonant tuned circuit, namely, a transmission line, the output voltage obtainable from the voltage multiplier is raised in accordance with the Q of the circuit.

More specifically, the diodes 45 simultaneously perform several functions. Thus, they rectify the voltage fed to the voltage multiplier and they also multiply the voltage. Furthermore, they protect the insulation, that is, the insulating sheets 50 and 54 and they equalize the voltages existing across the diodes. Furthermore, the diodes provide a direct current path for the current supplied to the accelerator and, of course, they form part of the resonant circuit which has just been referred to.

The layers of insulation 50 or 54 also perform several functions. Thus, they form part of the resonant circuit previously described, that is, part of the transmission line. Furthermore, they form part of the voltage multiplier circuit. In addition, they serve, of course, as insulation to insulate the output voltage of the order of 100 kv. from ground. Finally, they reduce the voltage stress across the envelope of the accelerator by providing a graduated voltage gradient, extending along the entire length of the accelerator.

Similarly, the sheets of metallic foils, such as 48 or 53 perform several different functions. Thus, each metallic foil shields the adjacent layers of insulation from the high voltage. Of course, they provide the capacitance along with the insulation layer for the voltage multiplier circuit. Furthermore, they form part of the voltage divider circuit which effectively breaks up the insulation into individual layers. Thus, the voltage across each layer of insulation cannot exceed a predetermined voltage so that it is possible to contain the 100 kv. within the very limited space available. Finally, the metallic foils, of course, form part of the transmission line to transmit the alternating current from stage to stage and at the same time to cause the high direct-current voltage to flow to the accelerator.

As previously explained, the neutron output of the accelerator 11 is preferably automatically controlled. To this end, the output current developed by the filament oscillator 27 is increased or reduced in accordance with the current flow in the voltage multiplier 32. This current flow, of course, supplies the target of the accelerator. On the other hand, the filament oscillator 27 supplies current to the filament of the accelerator which either releases heavy hydrogen gas or absorbs it.

It has been found that the control of the gas pressure of the accelerator is extremely important to the successful operation of the accelerator and to obtain a constant neutron output. Preferably, the accelerator is operated at the minimum gas pressure which will still pass the required amount of electric current. By way of example, the target current may be between 10 microamperes and 1 milliampere depending upon requirements. However, whatever target current is selected, it must be controlled accurately, thereby to control the neutron output and to hold it constant. If the neutron output should vary, this might falsify the readings of the instrument. To this end the automatic gain control circuit illustrated in FIG. 3 may be used.

This circuit of FIG. 3 operates by increasing or decreasing the output of an amplifier feeding the filament oscillator and included in the block 27 so as to increase or decrease the gas supply in the accelerator tube in accordance with variations of the target current fed into the accelerator through the voltage multiplier 32. Thus, a diode 131 is connected between the junction point of capacitor 34 and diode 45 to ground. This diode 131 is so poled as to bypass high-voltage negative transients to ground. Accordingly, if such transients develop they will not destroy the subsequent circuitry.

A capacitor 132 is also connected between the junction point between capacitor 34 and diode 45 and ground. This capacitor bypasses the alternating current from the transformer 31 to ground. A dropping resistor 133 is also connected across the capacitor 132 and develops a voltage drop thereacross as a result of a portion of the target current flowing through the resistor. This voltage becomes a reference voltage to control the control circuit connected between resistor 133 and the filament oscillator 27. This includes a current limiting resistor 134 connected between the dropping resistor 133 and the base of a transistor 135.

Assuming, for example, that the target current is too high at 70 microamperes and the resistance of resistor 133 is 100,000 ohms, there will be a voltage drop of 7 volts fed to the base of the transistor 135 through the limiting resistor 134. As a result a similar voltage will be developed at the emitter of the transistor 135, the collector being connected to a positive voltage source +B as shown. This voltage is developed across the resistor 136 connected between the emitter of transistor 135 and ground. This positive voltage will cause the Zener diode 137 to pass current to the base of transistor 138, the emitter of which is connected to ground by resistor 140.

This, in turn, reduces the output of the filament oscillator 27 because the transistor 138 now conducts and operates as a variable resistor bypassing the amplifier of the oscillator or else directly the oscillator. As a result of this control less gas will be liberated by the filament fed by the oscillator 27, the pressure in the tube will decrease and the current supplied by the voltage multiplier 32 will also decrease until the control action ceases again.

Thus, the gas pressure in the accelerator is controlled in accordance with the high-voltage current fed to the target of the accelerator. The transistor 135 operates as a current amplifier. The Zener diode 137 is a switch, while the transistor 138 may be considered a variable resistor bypassing a portion of the amplifier or oscillator output forming part of the filament oscillator 27.

Having now described the linear accelerator, its voltage supplies and including the high-voltage supply represented by the voltage multiplier, reference is now made to FIG. 10 which is a block diagram of the equipment provided at the surface on the ground as well as that disposed in the exploration unit 10, as shown in FIGS. 1 and 2. This block diagram shows how the voltage multiplier and the linear accelerator may be utilized to analyze unknown substances or formations surrounding an oil well. In particular, the block diagram shows how the gamma rays may be measured, analyzed and recorded according to their energies and how two different types of neutrons may be measured having different time delays after the bombardment with the primary neutron irradiation. From the two different types of neutrons which are measured it is also feasible to obtain the neutron cross-section. In order to do this, the rate of decay of the neutrons is measured. In other words, what is measured is the number of neutrons which disappear in a given period of time and this is a measure of the neutron cross-section of the formation.

Figure 10B:
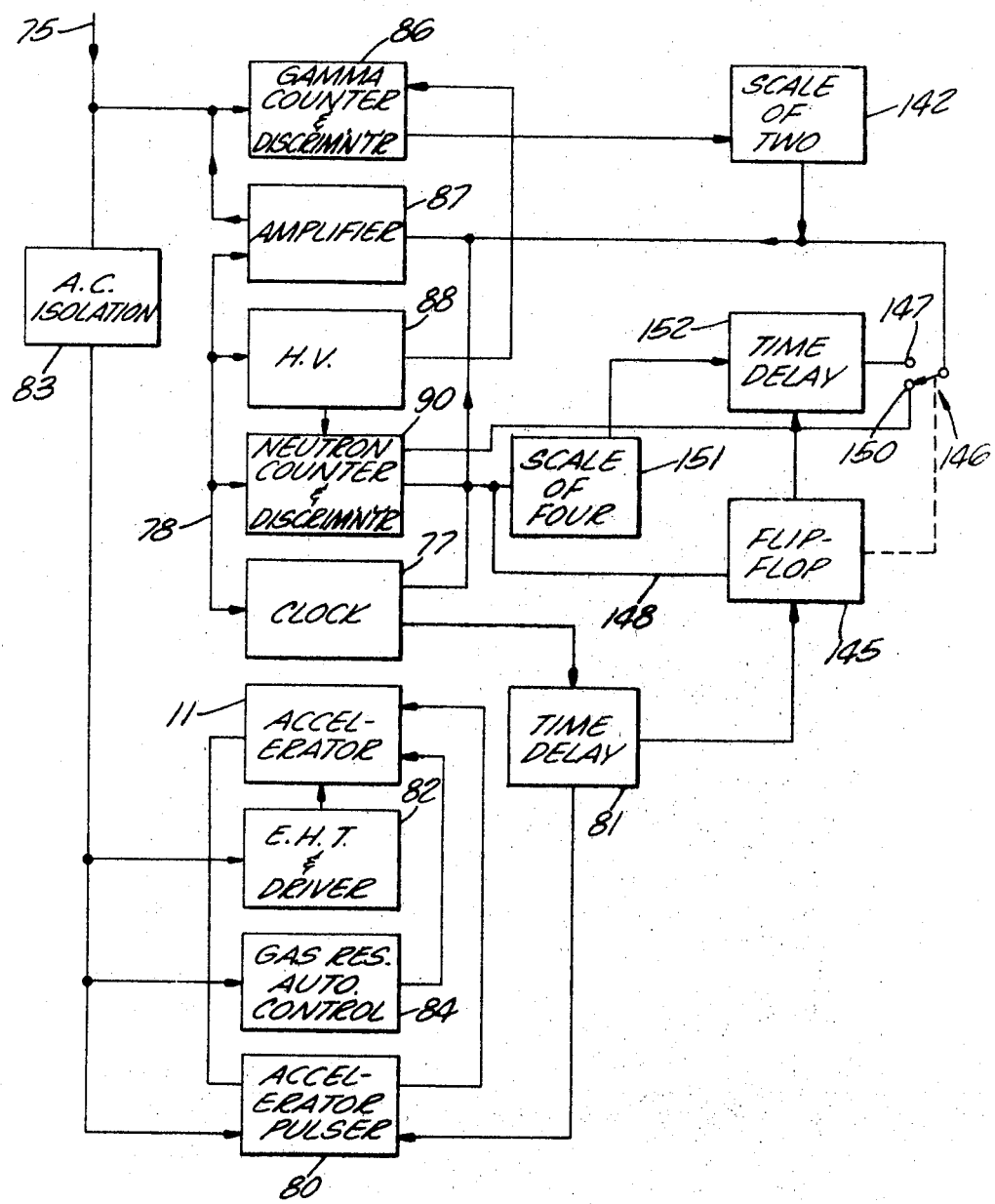

Turning now to FIGS. 10A and 10B there is shown in block form the equipment at the surface of the ground and in the exploration unit for determining, for example, the energy and intensity of gamma rays, the neutron cross-section of various elements and the like.

As shown in FIG. 10A the current control shown in box 70 is supplied with 300 volts DC (direct current). This of course is a regulated voltage supply. The box 70 performs the function of controlling the current which is supplied to the line or cable regardless of the length of the line. It should be noted that the line or cable may be as long as several miles.

The current control feeds into a box 71 which is for isolation purposes and may, for example, take the form of a choke. This is connected directly through a lead 72 into line safety 73. The line safety 73 is so arranged that power supply cannot be left on when for example, the exploration unit is lifted to the ground and a gun plugged in which might kill the operator. Thus, if the logging tool is moved or lifted to the surface of the ground and disconnected, certain steps must be taken on the surface before the power to the line can be turned on again. Thus, line safety 73 simply serves the purpose to increase the safety of the tool.

A time delay 74 is connected to the current control 70. This prevents applying the full current to the lead 72 and to the cable 75 immediately. When the accelerator 11 is first started, there is practically no gas pressure in the accelerator and, hence, it will not draw any current. On the other hand, the voltage multiplier will immediately build up a high voltage, which may possibly destroy the accelerator. Accordingly, the time delay prevents applying the full current to the cable 75 instantly and, hence, to the accelerator 11.

The short protection 76 serves the purpose to turn the power supply 70 entirely off, if there should be a short on the line for any reason. This, of course, will protect the cable 75, the power supply and all of the downhole equipment.

The electronic equipment in the downhole instrument or exploration unit is shown in FIG. 10B. Thus, there is shown a clock 77, which is the master timer for the entire system. The clock pulses are sent up the line through lead 75 and at the same time are applied to the accelerator pulser 80 through a time delay 81. The accelerator pulser 80 is the one previously referred to at 28 in FIG. 3 and turns the accelerator on and off after a suitable time delay provided by the time delay 81. The electric high tension and driver 82 includes the voltage multiplier structure previously discussed in connection with FIGS. 4 through 9. It is powered by the controlled current delivered by control 70 flowing down through the line 75 and drives, in turn, the accelerator 11, as shown.

The block shown as AC (alternating current) isolation 83 serves the purpose to isolate the accelerator 11 and the clock generator 77 from the signals sent up the line 75 by the gamma ray and neutron detectors and discriminators to be presently described. Furthermore, there is provided a gas reservoir automatic control 84. This automatic control senses the amount of the gas in the accelerator 11 and releases sufficient gas in the accelerator so that the accelerator can draw the proper current. This, of course, is done by controlling the filament voltage developed by the box 27 of FIG. 3.

There is further provided in the exploration unit a gamma ray counter and discriminator 86. This preferably includes a scintillation detector of the type disclosed and claimed in the Pringle, Roulston and Brownell Re. Pat. No. 25,634. Such a gamma ray counter and discriminator includes a scintillating crystal in optical contact with a photocell multiplier and an amplitude discriminator for developing electrical output pulses. Each of the output pulses indicating a gamma ray having an energy above a predetermined level or within a predetermined energy range. The pulses obtained from the discriminator 86 may be passed through a scale-of-two network or scaler 142, and are then fed into the amplifier 87. The scale-of-two scaler 142 may consist, for example, of a flip-flop and serves the purpose to reduce the number of pulses that has to be passed over the transmission line 75. Instead of a scale-of-two, a scale-of-four scaler may be used. These pulses are then amplified by the amplifier 87 and sent up the line 75. There is further provided a high-voltage supply 88 connected to the gamma ray counter and discriminator 86. This will develop an output voltage of the order of a thousand volts for operating the photocell multiplier.

There is further provided a neutron counter and discriminator 90 which may be similar in nature to the gamma ray counter and discriminator 86, except that the scintillating crystal is responsive to neutrons. For example, it is feasible to utilize lithium iodide as the scintillating crystal for detecting neutrons. For the detection of gamma rays a cesium iodide crystal may be used. Neutrons may also be detected by suitable gas counters. Again, the output of the discriminator 90 is a series of pulses each representing a neutron having an energy above a predetermined level or with a predetermined energy range. The discriminators 86 and 90 are so arranged as to deliver pulses of opposite polarity to the amplifier 87. The high-voltage supply 88 is also connected to the neutron counter and discriminator 90 to provide its photocell multiplier tube with the necessary operating voltage.

Hence, a series of pulses of opposite polarity, one representing gamma rays while the other is indicative of neutrons is sent up the cable 75. These pulses are now treated at the surface to obtain valuable information about the nature of the formation surrounding the exploration unit.

The signals sent up the cable 75 and which pass through the line safety 73 and the lead 72 are now separated from each other by a set of three filters 92, 93 and 94. The box 92 represents the neutron signal filter and amplifier, while the gamma signal filter and amplifier is shown by box 93. Since the pulses representing neutrons and those representing gamma rays are of opposite polarity they may readily be separated from each other on that basis by the two filters. Actually, the filters 92 and 92 serve another purpose and allow only the high-frequency portion of the neutron or gamma ray pulses to pass. These filtered pulses are then amplified and further processed as will be susbequently explained. By way of example, the neutron pulses impressed upon the cable 75 may be of negative polarity so that the neutron signal filter 92 is responsive to negative polarity pulses only.

The gamma signal filter and amplifier 93 serves a similar purpose but will pass only positive pulses rather than negative pulses. The gamma signal filter and amplifier 93 also includes a pulse inverter. In other words, the pulses obtained from the filter 93 are inverted in polarity so they have the same polarity as the pulses obtained from the neutron signal filter and amplifier 92. Again, the filter allows only the high-frequency portion of the gamma ray pulses to pass which are subsequently amplified and further processed.

Finally, the filter 94 for the synchronizing pulses discriminates against the gamma ray and neutron pulses and only accepts synchronizing pulses generated by the clock 77 in the exploration unit. These synchronizing pulses are positive and are of large amplitude. Hence, they are readily discriminated or distinguished from the gamma ray and neutron pulses on account of their larger amplitude. These synchronizing pulses, in turn, time the entire gamma ray and neutron discriminator chains on the surface of the ground.

As indicated by the dotted box 95, there is a gamma ray card which contains the circuitry for processing the filtered gamma ray signals. Thus, the filtered and amplified pulses from the filter 93 are passed to a discriminator 96. The discriminator is used again to discriminate against any pulses having less than a predetermined amplitude. Thus, the purpose of the discriminator 96 at the surface of the ground is to discriminate against noise pulses or degraded pulses. It further serves the purpose to restore the shape of the pulses in such a manner that the pulses are of uniform shape and can be used in a rate meter to develop an average current indicative of the number of pulses.

As noted previously there is also provided a discriminator 86 in the well logging instrument for discriminating against gamma rays of predetermined amplitude and a similar discriminator 90 for discriminating against neutron pulses of certain amplitude. The reason for providing a discriminator in the well logging nstrument rather than at the surface requires some further explanation. Thus, in order to provide a pulse rate some time after the bombardment, which is high enough from the statistical point of view to give significant results, it is necessary to make sure that there is a very high number of pulses due to gamma rays or neutrons while the accelerator is irradiating the formation or shortly thereafter. Thus, the count rate may be 50 times as high, say 50 microseconds after the irradiation is turned off, than it is after 1000 microseconds (or one millisecond) after bombardment. These pulse ratios may even be as high as 1000 to 1. Thus, in order to have at least 20 or 30 counts for the log taken the longest time after bombardment, it may be necessary ot have 10,000 to 15,000 counts per second within the first 15 microseconds after bombardment ceases.

The cable 75 normally has a length of about 20,000 feet. The wire used in this cable for transmission purposes is generally designed to have high mechanical strength rather than for good electrical characteristics. Also, the best dielectrics and the best obtainable electrical loading characteristics are detrimental to the mechanical strength of the line. Therefore, the line of a conventional logging cable has rather poor electrical characteristics. These prevent the transmission of more than 2,000 or 3,000 pulses per second occurring at random.

For this reason, it is preferred to use a so-called scale-of-four scaler which may consist of two serially connected flip-flops, that is, a device which divides the number of incoming pulses by 4. The provision of such a scale-of-four scaler will be subsequently explained. Such a scaler, in addition, has a smoothing or averaging effect on the counting rate. In other words, the number of counts transmitted through a scale-of-four scaler is less random than the original pulses and therefore the pulses transmitted occur more regularly and are easier to transmit.

On the other hand, the discriminators 86 or 90 as the case may be remove all pulse height characteristics from the pulses transmitted. In other words, the pulses do not indicate any more, after having been passed through the discriminator, the energies of the original gamma rays or neutrons.

Preferably, the output pulses of the discriminator 96 are all of equal amplitude so they can be readily counted by the rate meter 97. Actually, the rate meter 97 responds to the average number of pulses in a unit of time, that is, it indicates the average current. This indication of the average number of pulses received in a unit time may be recorded by a gamma ray recorder 98.

The synchronizing pulses which have passed through the filter 94 are then impressed upon a time delay network 100 which also forms part of the gamma ray card. This has an adjustable time delay to open the gate 101 for a predetermined length of time, thereby to permit the discriminator 96 to pass pulses above its predetermined amplitude range. Therefore, gamma rays may be measured and counted beginning at any time after the accelerator has been turned off and for any predetermined length of time. All of this is controlled by the master clock pulse or synchronizing pulse generated by the clock 77.

As will be subsequently explained in connection with FIG. 11, the synchronizing pulse or the master timing pulse is sent out by the clock 77 before the accelerator is started, thereby to make sure that the cable 75 is clear of signals and free to carry the synchronizing pulse to the surface of the ground.

The three neutron cards disposed in dotted boxes 102, 103 and 104 are of the same construction as the gamma ray card in dotted box 95. The reason that the neutron cards shown in dotted boxes 102, 103 and 104 can be of the same construction as the gamma ray card 95 is the provision of the inverter forming part of the filter and amplifier 93. Therefore, the polarity of the neutron pulses and that of the gamma ray pulses becomes the same and the four cards 95, 102, 103 and 104 can be made identical.

Thus, the filtered neutron signal which has been amplified by the equipment in box 92 is impressed on the discriminator 105 of what has been designated neutron #1 card. The discriminator 105 is coupled to the rate meter 106 which, in turn, is connected to the neutron #1 recorder. This equipment has the same purpose as that previously described, namely, the discriminator will discriminate against pulses representing neutrons below a predetermined amplitude or will only transmit pulses within a predetermined range. The average number of such pulses is then determined by the rate meter 106 and the result is plotted on the recorder 107.

Again there is a time delay circuit 108 which receives the filtered synchronizing pulse and, in turn, controls the on-time of the gate 110. The gate 110, in turn, permits the discriminator 105 to operate within a predetermined time after the irradiation of neutrons stops and for a predetermined length of time.

Since the equipment shown in dotted boxes 103 and 104 corresponding respectively to neutron #2 card and neutron #3 card are the same as those in the dotted box 102, they will be designated by the same reference numbers primed and double primed.

In addition, it is possible with the equipment shown at the surface of the ground and particularly with the results obtained from the neutron channels #2 and #3 to determine the cross-section of the irradiated formation, such cross-section being usually measured in barns. Actually what is determined is the capture cross-section of the formation being irradiated for neutrons within a certain time after the original irradiation.

To this end, the output of the discriminator 105' is electronically divided by the output of discriminator 105", to obtain the barns cross-section log by means of block 115. In other words, the ratio of the number of neutrons as measured by discriminator 105' is divided by the number of neutrons as measured by the discriminator 105". The manner in which the ratio of the two pulse trains representing the number of neutrons at two different times is obtained, is illustrated in FIG. 12 which will be subsequently explained. In order to record the result of the cross-section in barns, there may be provided a barns recorder 116 which is coupled to the barns cross-section log 115.

The system of the invention as illustrated particularly in FIG. 10A lends itself to the measurement of a carbon log. It is well known, that when carbon is bombarded by fast neutrons, the neutrons lose energy by inelastic scattering by the carbon nuclei. The carbon nucleus becomes excited and immediately emits gamma rays having an energy of 4.45 mev. These are so-called prompt gamma rays due to inelastic scattering of fast neutrons having, of course, an energy in excess of 4.45, such as 14 mev. Such high energy prompt gamma rays are characteristic of carbon. Only a few other elements, such as oxygen, for example, produce such prompt gamma rays in response to inelastic neutron scattering.

In accordance with the present invention, these prompt gamma rays having an energy of 4.45 mev. are detected by means of the carbon log card 143. A time delay circuit 108''' is connected to the filter synchronizing pulse network 94. The output of the time delay circuit 108''' is again connected to a gate-on time circuit 110'''. The pulses representative of neutrons are fed into a block 144 where they are processed after a certain time delay. Since the gamma rays to be measured are prompt gamma rays they must be measured while the formation is being irradiated, that is, during bombardment. The pulses representing gamma rays may be processed by the block 144 in any of the ways disclosed and claimed in the Martin, Pringle and Roulston Pat. No. 2,965,757.

It should be realized that after the accelerator is turned off, the high energy neutrons of 14 mev. very quickly loose their energy by elastic or inelastic impact. Such relatively low-energy neutrons produce large quantities of high-energy gamma rays due to neutron capture; these neutron capture gamma rays should be eliminated from the carbon log. Therefore, the gate 110''' should only be open for a very short period of time.

In order to do this more efficiently there may be provide the equipment shown in FIG. 10B in the well hole. This includes a flip-flop 145 connected to the time delay 81 and adapted to operate the switch 146. While the switch 146 has been schematically shown as a mechanical switch, it is to be understood that in practice an electronic switch will be used instead to permit switching at the necessary fast rate. When the switch 146 is in the position shown in FIG. 10B with the switch arm connected to contact 147, the output of the counter 90 is directly connected to the input of the amplifier 87. The switch 146 remains in this position for a predetermined time or until the first gamma ray is detected by the neutron discriminator 90. In other words, the switch remains in that position before and until the beginning of the irradiation. At such a predetermined time, or when the first gamma ray pulse is detected by the discriminator 90, the flip-flop 145 is energized through connection 148 and turns the switch arm to the contact 150. Hence, the output of the neutron counter and discriminator 90 is connected through a scale-of-four scaler 151 and a time delay network 152 to the amplifier 87. The purpose of the time delay circuit 152 is to prevent any signals from going up the line for a time sufficient to clear the line of the one proportional gamma ray pulse that has been sent to the surface. After this time delay, the flip-flop 145 turns the switch arm of switch 146 again back to the contact 147. Accordingly, the output of the neutron counter and discriminator 90 is again directly connected to the amplifier 87. A scale-of-two or a scale-of-four scaler may be interposed between the discriminator 90 output and the amplifier 87.

The circuit which divides the pulses representative of the neutron #2 channel and the neutron #3 channel is illustrated in FIG. 12 to which reference is now made. This circuit actually divides the respective two trains of pulses and makes use of suitable pulse memories. Accordingly, the output of the circuit is actually representative of the ratio of the two pulse trains received. It is also feasible, as will be subsequently explained, to subtract from each of the pulse trains received a constant background of radiation which may be due, for example, to long-lived isotopes, Thus, by means of lead 156 a pulse train corresponding to the neutron #2 channel is impressed on the circuit. Similarly by input lead 157 another pulse train of the neutron #3 channel is impressed on the circuit. It should be noted that there are more pulses corresponding to the neutron #2 channel than those of the other channel because the pulse train on input lead 156 was taken at an earlier period of time where more neutrons were yet in existence. The output is obtained from output lead 158. More specifically the neutron #2 channel is obtained with the gate open during a period of 400 to 500 or 600 microseconds as shown in FIG. 11 at 121. Similarly, the neutron #3 channel is obtained with the gate open between 700 and 800 or 900 microseconds as shown at 122 in FIG. 11. The input lead 156 may be connected as explained before to the discriminator 105', or to the preamplifier of the rate meter 106', while the input lead 157 may be connected to the discriminator 105'', or to the preamplifier of the rate meter 106''. The output lead 158 is connected to the barns recorder 116.

The input lead 156 is connected through a current limiting resistor 160 to the base of a transistor 161 which is connected as an emitter follower. The collector is connected to a suitable positive voltage supply $+B_1$ which may, for example, have a voltage of $+200$ volts. The emitter of the transistor 161 is connected to ground through resistor 162. By means of an adjustable resistor 163 and a diode 164 the emitter of transistor 161 is connected to a capacitor 165 having one end grounded. Whenever a pulse is applied to transistor 161, the transistor becomes conductive, and the emitter thereof assumes a positive voltage for about 100 microseconds for each pulse. This electric charge charges the capacitor 165, the capacitor serving as a memory which may be called the base memory of the circuit.

Assuming, for example, that it takes 30 pulses to charge the capacitor 165, the unijunction transistor 166 is fired through the transistor 167 whenever the capacitor 165 has reached a predetermined charge. This may occur after 30 input pulses. At that time, the transistor 167 which is also an emitter follower becomes conductive. Its collector is connected to another positive voltage source indicated in $+B_2$ through a resistor 168. By way of example the voltage source $+B_2$ may have a positive voltage of 20 volts. The unijunction transistor 166 may have its base #1 connected to the voltage source $+B_2$ through a resistor 170 while its base #2 is grounded through a resistor 171. Every time the unijunction transistor 166 is caused to conduct in the manner just disclosed it will trigger a controlled rectifier flip-flop circuit generally indicated at 172 by applying a voltage between a pair of capacitors 173 and 174.

The base memory or storage capacitor 165 is charged not only through the transistor 161 but also through a source of negative voltage indicated at —B. This source is grounded through a resistor 175 having a variable tap 176 connected to the capacitor 165 through a limiting resistor 177. Thus, by adjusting the variable tap 176 the amount of current fed to the capacitor 165 may be controlled. The constant current applied to the memory capacitor 165 from a negative voltage source in this manner has the effect of reducing the charge on the capacitor which otherwise is applied to it through the firing of transistor 161. As a result the unijunction transistor 166 fires later than it would without the action of the direct current source 175, 176, 177.

The reason for this is that it is desirable to subtract a background gamma radiation which is normally present. This may, for example be caused by gamma rays which have a relatively long half-life and which are caused by bombardment of certain elements with fast neutrons. An example of this is a 6.13 mev. gamma ray caused by bombardment of oxygen with fast neutrons. This gamma radiation has a half-life of 7.3 seconds, which is, of course, relatively long compared to the milliseconds during which the various logs are taken. Since it has been found that the oxygen content of any formation is surprisingly constant, as long as the number of neutrons developed by the accelerator remains constant, it is feasible to subtract the oxygen background by means of this constant current.

The base memory which has just been described and which includes the base memory capacitor 165 drives the flip-flop 172 for interrogating one memory of the second pulse train and for simultaneously destroying the information built up in a second memory of the second pulse train. These two memories are controlled by the neutron #3 channel appearing on input lead 157. A pulse appearing on neutron #3 channel input lead 157 is applied to the base of transistor 180 through a limiting resistor 181. The collector of transistor 180 is again connected to the positive voltage source $+B_1$, while its emitter is grounded through resistor 182. This emitter follower 180 develops an output wave which is similar as that build up across the base memory capacitor 165. Thus, the output of the emitter follower transistor 180 is applied through an adjustable resistor 183 and a diode 184 to a buffer capacitor 185. The charge build up across the buffer capacitor 185 is subsequently transferred through diode 194 to memory storage capacitor 193 which might be called the memory #1 capacitor. As pointed out before, the number of pulses on input lead 157 is much smaller than that on input lead 156.

After the memory #1 capacitor 193 has been charged to a predetermined voltage level, the other memory capacitor 193' is charged in a similar manner. The memory capacitor 193' forms part of the memory #2 circuit, the elements of which are designated by prime numbers and need not further be described.

The flip-flop circuit 172 is conventional, and, hence, a further description is not believed to be necessary. However, it includes two silicon-controlled rectifiers, one of which is shown at 187. Depending on the state of the flip-flop there may, for example, be a positive voltage at the point 188 which is applied to the base of transistor 190 through a resistor 191, the base being grounded by resistor 192. Also, the emitter of transistor 190 is grounded.

The transistor 190 serves the purpose to prevent the charge applied across the buffer capacitor 185 from rising during an undesired period and, hence, to stop the increase of the charge across the memory storage capacitor 193 during the read period. Thus, the storage capacitor 193 is being charged while the potential at point 188 is relatively low or negative. When the potential at point 188 becomes sufficiently positive, the transistor 190 will conduct to ground every time a positive pulse is impressed through variable resistor 183 on its collector. This will prevent the positive pulse from being impressed on buffer capacitor 185 through diode 184 and thence through diode 194 on memory capacitor 193. Accordingly, the charge across the memory capacitor 193 becomes limited at the time flip-flop 172 changes its state so that point 188 becomes positive.

The storage capacitor 193 is eventually discharged through ground under the control of a transistor 215. Thus, let it be assumed that the flip-flop 172 changes state so that point 188 again assumes a lower potential that is a less positive potential. The base of the transistor 215 is connected to the point 188 through capacitor 217 and diode 216, the junction point of which is grounded by resistor 218. The emitter of transistor 215 is grounded while its collector is connected to $+B_2$ through resistor 220. Also the base of transistor 215 is connected to $+B_2$ by resistor 219. Accordingly, the transistor 215 normally conducts, that is, as long as the point 188 is positive. When the point 188 becomes less positive or negative, the diode 216 ceases to conduct. Capacitor 217 is discharged to ground through resistor 218 and as a result of the relatively negative potential impressed on the base of transistor 215 it now ceases to conduct.

As a result, the potential of voltage source $+B_2$ is impressed by resistors 220 and 222 on the junction between capacitor 221 and Zener diode 223. This positive potential will cause the Zener diode 223 to conduct and impress a positive potential on the control electrode of a silicon-controlled rectifier 224, having its cathode grounded. Its anode is connected through diode 226 and resistor 225 to memory capacitor 193.

Accordingly, the positive trigger pulse applied to Zener diode 223 will fire the controlled rectifier 224 which consequently discharges the storage capacitor 193 to ground. Thus, the capacitor 193 is rapidly and precisely discharged through the controlled rectifier 224 under the control of the transistor 215 in response to the voltage at point 188 changing from a positive to a less positive or negative value.

Thus, in essence, the transistor 215 and associated components forms a pulse inverter and pulse shaping circuit. The purpose of the diode 226 and controlled rectifier 224 is to prevent the discharge of the storage capacitor 193 below a predetermined value which represents the collective threshold levels of the semiconductor elements of the discharge circuit.

Thus, it should be noted that a staircase voltage wave is alternatively built up across the memory capacitors 193 and 193'. These voltages, in turn, are periodically discharged through the respective controlled rectifiers 224 or 224'. Accordingly, while the voltage of one memory capacitor builds up, the voltage across the other memory capacitor may be held constant and may then be discharged or interrogated depending upon the state of the flip-flop 172 which, in turn, is determined by the input pulses received from neutron channel #2.

Again, a negative direct current is applied to buffer capacitor 185 and similarly to buffer capacitor 185' by a variable tap 202 on a resistor 203 connected between the negative voltage source —B and ground. This voltage is applied to the capacitor 185 through a resistor 204 and diode 205. In a similar manner the same direct current is applied to buffer capacitor 185'.

It will thus be seen that output transistor 200 is caused to conduct in accordance with the ratios of the pulses appearing on the two input leads 156 and 157.

The output transistor 200 is in turn coupled to two cascade connected transistors 210 and 211 which are arranged as emitter followers. The output signal obtained from output lead 158 is adjustable by resistor 212 connected between the emitter of transistor 211 and ground, and which has a variable tap 214.

Briefly then, the base memory potential across the base memory capacitor 165 builds up in a staircase voltage pattern, until the firing threshold of unijunction transistor 166 is reached. The recorder connected to the output lead 158 records the voltage stored on memory #1 capacitor 193 while the potential charge on memory #2 capacitor 193' builds up again in a staircase voltage pattern. At the same time, the base memory stored across capacitor 165 also builds up to the firing point of its transistor 166. Thus, the output current or potential recorded is representative of the number of events recorded in channel #2 divided by the number of events recorded in channel #3 less a predetermined background radiation in all the channels. This recorded current or voltage represents directly the neutron cross-section, which may be calibrated in barns.

Reference is now made to FIG. 11 which shows on a time scale arranged in hundred microseconds the clock synchronizing pulse 116 as well as the time relationship of the various logs which may be made with the equipment illustrated in FIG. 10A. Thus, the accelerator is turned on at zero time as shown by the line 117. The clock pulse is turned on, say 150 microseconds before the accelerator is turned on. The reason for this is that the line must be clear of the synchronizing pulse. This line or cable may be several miles long and it may have a resolving time of the order of 40 microseconds. Thus, there should be sufficient time allowed for the line to quiet down again after the trigger pulse has been sent up to the ground. This waiting period is at least 40 microseconds.

Then a predetermined time after the accelerator has been turned off again the early neutron log 120 is taken. This is started say 40 microseconds after the accelerator has been turned off and the early neutron log is measured for a period in the order of 100 microseconds. It should be noted that the accelerator must be turned on by its 1 kv. pulse (see FIG. 3) for a period of 12 to 15 microseconds until any neutrons are generated. Obviously it will take some time for the ionization source to generate ions which then are accelerated toward the target to produce neutrons by the deuterium-tritium reaction.

FIG. 11 also shows a carbon log 155. It will be noted that this is recorded before the time O, that is, before the irradiation begins, and for a short period of time thereafter. The gate 110''' on the surface will be correspondingly set to permit pulses representative of gamma rays to be transmitted for a proper period of time.

It should also be noted that the accelerator usually contains occluded or adsorbed gases and must be cleaned by repeated runs before it is first used. If precautions are not taken, the accelerator may act like a thyratron and may pass large currents which can be detrimental to the accelerator and the electronic equipment. To this end, the resistor 33 is used which serves the purpose to protect the accelerator from arcs and other troubles which may lower the resistance of, and hence destroy the accelerator. It should also be noted that there is distributed capacitance in the accelerator.

The medium neutron log 121 is started, say 400 microseconds after the accelerator has been turned off as shown by the line 117. The medium neutron log is run again for 100 or 200 microseconds.

The late neutron log 122 may be started 700 microseconds after the accelerator has been turned off and also may be run for 100 or 200 microseconds.

The gamma ray log 123 may be started at the same time as the early neutron log, that is, 40 microseconds after the accelerator is turned off. This, in turn, may be run for 900 microseconds, that is, until almost 1 millisecond has passed.

The neutron generator is pulsed on for about 1 microsecond and remains off for approximately 1000 microseconds or 1 millisecond. Therefore, the generation is about 800 times per second. If the average current flowing through the accelerator is 150 microamperes, then the peak current is 150 milliamperes. The average output of neutrons is on the order of $10^9$ neutrons per second. During each neutron pulse which lasts for about 1 microsecond, neutrons are produced at the rate of $10^{12}$ neutrons per second.

Generally, the early neutron log 120 serves as a monitor to monitor the accelerator output as well as the stability of the detector and the entire electronic system. It can, therefore, be used to detect troubles. It also provides information about the general background radiation which can be subtracted from the other neutron log, namely, the medium and the late neutron log.

On the other hand, the medium neutron log gives the scattering cross-section of the irradiated formation for hydrogen and the capture cross-section of chlorine. Generally, the late neutron log when compared to the medium neutron log, indicates the capture cross-section of the formation as is well understood in the art.

To further explain the previous statements, the capture cross-section for slow neutrons of chlorine is 3200 millibarns, which is a very large cross-section. Therefore, in the presence of chlorine, very few neutrons are left after say 600 to 1000 microseconds after the original irradiation. Hence, the fewer neutrons there are present in the late neutron log, the more chlorine there must be present. It should be noted that this large capture cross-section is for slow neutrons only and not for fast neutrons.

There has thus been disclosed a nuclear system for analyzing an unknown substance or a geological formation surrounding a well bore. To this end, the unknown substance or formation is irradiated with high-energy neutrons which are subsequently turned off. A predetermined time after the irradiation the number of neutrons may be determined to obtain information about the amount of chlorine and hydrogen present in the substance. In addition, a cross-section log may be directly obtained electronically from two of the neutron logs. Furthermore, a gamma ray log may be taken of gamma rays having energies above a predetermined level or within a predetermined energy range. From these logs which may be plotted simultaneously, valuable information may be obtained concerning the composition of the unknown substance by elements and even the approximate percentage of the elements present.

In addition there has been disclosed a voltage multiplier structure which can be accommodated in the space available in a conventional well exploration unit which may have an outer diameter of 3½". This voltage multiplier structure transforms an input voltage of a few hundred volts which may be transformed by a transformer to yield an output voltage of the order of 100 kv. This voltage multiplier is of the Cockroft-Walton type utilizing a large number of diodes connected in series and having their junctions connected to two sets of capacitors formed by wrapping an insulating material and metallic foils to obtain the necessary number of capacitors. The voltage multiplier not only can be accommodated in the very limited space of a well exploration unit but in addition is capable of withstanding the high temperatures encountered in deep oil wells.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and I do not wish to be restricted to the specific form shown or uses mentioned except as defined in the accompanying claims, wherein various portions have been separated for clarity of reading and not for emphasis.

It will be understood that any conventional accelerator may be used with the apparatus of the present invention instead of that disclosed in the Martin and Stroud patent above referred to.

Furthermore, the undesired gamma radiation may also be compensated for by inverting the output of the neutron #1 channel and feeding it into the circuit of FIG. 12 instead of the —B voltage.

I claim:

1. A high-voltage multiplier structure adapted for operation in a space having a small diameter, such as an oil well, comprising:
    (a) a high voltage input source;
    (b) a plurality of diodes connected in series;
    (c) a first and a second set of capacitors;
    (d) the capacitors of each set consisting of a sheet of insulating material folded on itself, and
    (e) a plurality of metallic foils of graduated sizes, each being disposed between two folds of its associated insulating sheet;
    (f) means for connecting each metallic foil to a predetermined junction between two of said diodes, whereby each capacitor is formed by two adjacent foils of each set; and
    (g) a utilization device connected to the last one of said capacitors.

2. A high-voltage multiplier structure adapted to be used in a well exploration unit of small diameter comprising:
    (a) an inner tube;
    (b) a middle tube;
    (c) an outer tube, said tubes being disposed concentrically to each other and consisting of an insulating material, said middle tube being provided with an outer screw thread;
    (d) a plurality of diodes disposed in said screw thread and connected serially to each other;
    (e) a first sheet of insulating material wrapped about the outside of said inner tube;
    (f) a first set of metallic foils, each being disposed between predetermined folds of said first sheet to provide a first set of inner capacitors;
    (g) a second sheet of insulating material wrapped about the outside of said outer tube;
    (h) a second set of metallic foils, each being disposed between predetermined folds of said second sheet to provide a second set of outer capacitors; and
    (i) means for interconnecting predetermined junction points between said diodes to successive ones of said foils of said inner and outer sets of capacitors.

3. A voltage multiplier structure as defined in claim 2, wherein said inner tube has a continuous and straight outer diameter, while said middle tube has a tapered inner diameter to accommodate said first set of inner capacitors.

4. A voltage multiplier structure as defined in claim 2 wherein said outer tube has an outer diameter increasing stepwise from one end of said outer tube to the other, thereby to accommodate successive windings of said second sheet of insulating material.

5. A voltage multiplier structure as defined in claim 2 wherein said first set and said second set of metallic foils are graduated in size in such a manner that the capacitance of said inner and said outer capacitors is larger at the input end of said structure than at the output end thereof.

6. A voltage multiplier structure as defined in claim 2, wherein said sheets of insulating material consists of a fluorocarbon resin.

7. A voltage multiplier structure as defined in claim 6, wherein every two successive metallic foils of said first set and of said second set are separated from each other by four folds of their associated sheet of insulating material.

8. A voltage multiplier structure as defined in claim 2, wherein said screw thread provided on the outer surface of said middle tube has a substantially square cross-section.

9. A voltage multiplier structure as defined in claim 2, wherein said means for interconnecting said diodes to said foils includes a spring connector extending through said middle tube to contact the outer surface of one of said second set of metallic foils on the outside of said inner tube.

10. A voltage multiplier structure as defined in claim 2, wherein said means for interconnecting said diodes to said foils includes a spring connector extending through said middle tube, a contact pin extending through said outer tube and having a contact surface in contact with said spring connector, said contact pin, in turn, contacting the inner surface of one of said second set of metallic foils disposed on the outer surface of said outer tube.

11. A high-voltage multiplier structure adapted for use in a space having a small diameter, comprising:
    (a) a high-voltage, alternating current input source;
    (b) a plurality of diodes connected in series;
    (c) a first and a second set of capacitors;
    (d) the capacitors of said first set consisting of a first set of successive cylinders of different lengths of insulating material having associated metallic foils; and (e) a utilization device coupled to the last one of said capacitors.

12. A voltage multiplier structure as defined in claim 11, wherein said utilization device consists of an elongated substantially cylindrical linear accelerator, and wherein said insulating cylinders and said metallic foils extend at least partially across the outer surface of said accelerator.

13. In a voltage multiplier structure:
(a) an insulating material of generally cylindrical shape formed to have successive substantially cylindrical layers; and
(b) a plurality of metallic cylinders of graduated sizes, each being interposed between successive cylindrical layers, said metallic cylinders shielding said insulating material, whereby said cylindrical layers of insulating material, together with said cylinders, form a set of capacitors, and whereby said insulating material insulates the entire structure from a high voltage supplied thereto.

14. In a high-voltage multiplier structure:
(a) a plurality of concentric cylindrical members of electrically insulating material;
(b) a plurality of metallic foils, each being disposed between two successive ones of said concentric cylindrical members to provide a set of capacitors for the voltage multiplier;
(c) a plurality of avalanche diodes connected in series; and
(d) means for connecting predetermined junctions between said diodes to predetermined ones of said metallic foils, whereby the high-voltage generated by the structure is contained by said cylindrical members, while said diodes change alternating current into direct current and protect said cylindrical members from voltage peaks.

15. In a high-voltage multiplier structure:
(a) a first plurality of concentric cylindrical members of electrically insulating material, said cylindrical members being of graduated length, the longest member having the smallest diameter and the shortest member having the largest diameter;
(b) a first plurality of metallic foils, each being disposed between two scccessive ones of said first plurality of concentric cylindrical members, each of said metallic foils extending beyond its associated upper cylindrical member, thereby to provide a first set of capacitors;
(c) a second plurality of concentric cylindrical members of electrically insulating material, said second plurality of cylindrical members being concentric with and disposed outside of said first plurality of cylindrical members, said second plurality of cylindrical members being of graduated length, the shortest member having the smallest diameter and the largest member having the largest diameter;
(d) a second plurality of metallic foils, each being disposed between two successive ones of said second plurality of cylindrical members, each of said metallic foils extending beyond its associated lower cylindrical member, thereby to provide a second set of capacitors;

(e) a plurality of avalanche diodes connected in series; and
(f) means for connecting predetermined junctions between said diodes to predetermined exposed ends of said metallic foils, whereby said cylindrical members protect the structure from a high voltage.

16. A high-voltage multiplier structure adapted for operation in a space having a small diameter, such as an oil well, comprising:
(a) a high-voltage input source;
(b) a plurality of series connected diodes spiraled about an elongated cylindrical support;
(c) a first set of capacitors arranged concentrically outwardly of said diodes, and a second set of capacitors arranged concentrically inwardly of said diodes;
(d) the capacitors of each of said sets consisting of a sheet of insulating material folded on itself, and a plurality of metallic foils of graduated sizes, each being disposed between two folds of its associated insulating sheet;
(e) means for connecting the metallic foils of said sets to predetermined junctions between groups of said diodes; and
(f) a utilization device connected to the last one of said capacitors.

17. A high-voltage multiplier structure as defined in claim 16, wherein said junctions are successively alternately connected with foils of the first set and foils of the second set of capacitors.

18. A high-voltage generator in which the high-voltage is confined, said generator being adapted for operation in a space having a small diameter, such as an oil well, comprising:
(a) a high voltage alternating current source;
(b) concentric cylindrical tapered capacitors adapted to resonate with said source;
(c) said cylindrical capacitors being alternately interconnected by a chain of avalanche diodes simultaneously coacting to provide a high-voltage generator and incremental voltage limiters; and
(d) said cylindrical capacitors simultaneously serving as high-voltage generating means and incremental insulating means to confine the generated high voltage.

References Cited
UNITED STATES PATENTS

| | | | |
|---|---|---|---|
| 3,063,000 | 11/1962 | Cleland | 321—15 |
| 3,123,751 | 3/1964 | Balsbaugh | 317—246 |
| 3,128,421 | 4/1964 | Skellett | 321—15 X |
| 3,274,468 | 9/1966 | Rodriguez et al. | 317—242 X |
| 3,295,047 | 12/1966 | Tarczy-Hornoch | 321—15 |
| 3,308,359 | 3/1967 | Hayworth et al. | 317—242 X |
| 3,329,247 | 7/1967 | Jaeschke | 321—15 X |

ROBERT K. SCHAEFER, Primary Examiner

T. B. JOIKE, Assistant Examiner

U.S. Cl. X.R.

317—246

UNITED STATES PATENT OFFICE
CERTIFICATE OF CORRECTION

Patent No. 3,521,144      Dated July 21, 1970

Inventor(s) Philip Martin

It is certified that error appears in the above-identified patent and that said Letters Patent are hereby corrected as shown below:

Column 1, line 49, "infomation" should read -- information --; line 69, "discused" should read -- discussed --. Column 9, line 34, "15" should read -- 125 --. Column 13, line 53, "filters 92 and 92" should read -- filters 92 and 93 --. Column 14, line 24, "nstrument" should read -- instrument --.

Signed and sealed this 11th day of May 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,521,144            Dated July 21, 1970

Inventor(s) Philip W. Martin

It is certified that error appears in the above-identified patent and that said Letters Patent are hereby corrected as shown below:

Column 7, line 20, for "insulating" (second occurrence) read --foil--.

Signed and sealed this 10th day of August 1971.

(SEAL)
Attest:

EDWARD M. FLETCHER, JR.          WILLIAM E. SCHUYLER, JR.
Attesting Officer                  Commissioner of Patents